(12) United States Patent  
Klein

(10) Patent No.: US 8,405,015 B1
(45) Date of Patent: Mar. 26, 2013

(54) MULTI-IMAGE LED PROJECTOR FOR SEQUENTIALLY PROJECTING A SERIES OF TRANSPARENCY IMAGES ONTO A SCREEN

(76) Inventor: Eric Klein, San Francisco, CA (US)

( * ) Notice: Subject to any disclaimer, the term of this patent is extended or adjusted under 35 U.S.C. 154(b) by 435 days.

(21) Appl. No.: 12/660,700

(22) Filed: Mar. 2, 2010

Related U.S. Application Data

(60) Provisional application No. 61/211,320, filed on Mar. 30, 2009.

(51) Int. Cl.
*H01L 27/00* (2006.01)

(52) U.S. Cl. .................................. 250/208.1; 353/94

(58) Field of Classification Search ............... 250/208.1, 250/205, 239, 214 R; 353/94, 84, 43, 108–110, 353/119; 352/87; 362/227, 235–248
See application file for complete search history.

(56) References Cited

U.S. PATENT DOCUMENTS 8,100,540 B2 * 1/2012 Huebner .................. 353/94

* cited by examiner

*Primary Examiner* — Que T Le

(74) *Attorney, Agent, or Firm* — Thomas M. Freiburger

(57) ABSTRACT

A multiple image LED projector comprises an array of LED elements directing light beams through a multi-frame image film focused by an array of lenses onto the same position on a projection surface. By lighting the LEDs in sequence, a slide show or animation sequence is projected onto the projection surface. The sequence can be played in reverse, or in different order of images for different effects.

11 Claims, 6 Drawing Sheets

MULTI-IMAGE LED PROJECTOR FOR SEQUENTIALLY PROJECTING A SERIES OF TRANSPARENCY IMAGES ONTO A SCREEN

This application claims priority from provisional application No. 61/211,320, filed Mar. 30, 2009.

BACKGROUND OF THE INVENTION

LED flashlights comprise one or more LEDs, one or more batteries, a power switch, and housing. These flashlights may direct their light through a mounted frame of developed film and a projection lens to produce a colored image that can be projected onto an exterior flat surface for viewing.

A projector is a device that uses light to produce an image on a reflective or translucent screen. Slide projectors cast single images while movie projectors cast multiple images sequenced to create the illusion of movement.

Miniature toy projectors have been developed that utilize an LED shining through a slide to project a single fixed image. A series of images forming a slide show or generating an animated image would produce a more compelling toy. Currently existing slide and movie projectors shine light either through a series of film frames moving through the object plane or through digital images on an LCD panel mounted in the object plane. These techniques are highly effective but have drawbacks such as high weight, large size, high power requirements, high cost, and, when moving parts are used, mechanical complexity.

What is needed is a simple, low cost, miniature LED projector capable of displaying multiple images.

Accordingly, several advantages of one or more aspects of the current invention are:

(a) to provide a multiple image LED projector that is miniature in size and weight;
(b) to provide a multiple image LED projector that is inexpensive to produce;
(c) to provide a multiple image LED projector that has no moving parts;
(d) to provide a low power multiple image LED projector;
(e) to provide a multiple image LED projector that can used as a component in toys or other devices such as promotional items;
(f) to provide a multiple image projector that need not be focused for varying projection distances.

SUMMARY OF THE INVENTION

A multiple image LED projector of the invention comprises an array of LED elements shining through a multi-frame image film focused by an array of lenses onto the same projection surface. By lighting the LEDs in sequence, a slide show or animation sequence is projected onto the projection surface.

A single image LED projector holds a mounted frame of developed transparency film in a position called the object plane. The LED includes a condenser system, comprising a curved reflector below and a curved refractor above, that collects light from the LED lamp and focuses it on the object plane. The filtered light is projected and focused onto a screen by a projection lens. A second lens, placed between the LED and the film or between the film and the projection lens, greatly improves the quality of the projected image.

The multiple image LED projector comprises stacked arrays of LEDs, film frames, and projection lenses. A regular, planar array of LED lamps with reflectors and refractors is mounted on a PCB board. A multi-panel frame of developed transparency film, mounted above the LED array in the object plane, filters the LED light. A multi-element projection lens, mounted above the film frame, projects and focuses the filtered light onto a screen. A second multi-element condenser lens, placed between the LED and the film or between the film and the projection lens, greatly improves the quality of the projected image.

The number and placement of the film panels and of the lens elements corresponds in number and placement to the elements of the LED array. Each LED together with the corresponding film frame panel and lens element(s) comprises a projector element. All the projector elements are focused on the same projection area. The projected images may be made coincident by offsetting the position of each film frame relative to the lens system. The film position offset differs between cells and depends on the overall image magnification and on the distance of each particular cell from the center of the array.

Each projection element is individually powered on and off under electronic control. Generally only one projector element is active at any time, though, using pulse width modulation, one element may be programmed to fade into another to create certain visual effects. By activating projection elements in a regular sequence, a slide show or short animation may be projected onto a viewing surface. The number of frames can be quite large, limited only by practical concerns of cost and space.

DESCRIPTION OF PREFERRED EMBODIMENTS

Figure 1A:
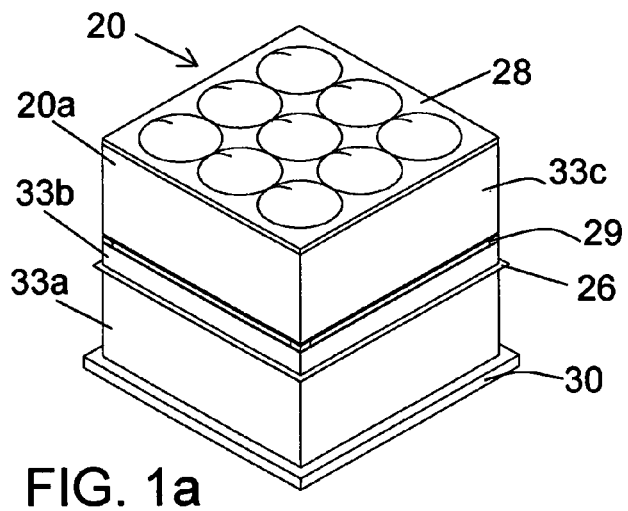
FIG. 1a is a perspective view of the multi-LED projection module.

FIG. 1a is a perspective view of an assembled multi-LED projection module 20, secured together as a housing 20a.

Figure 1B:
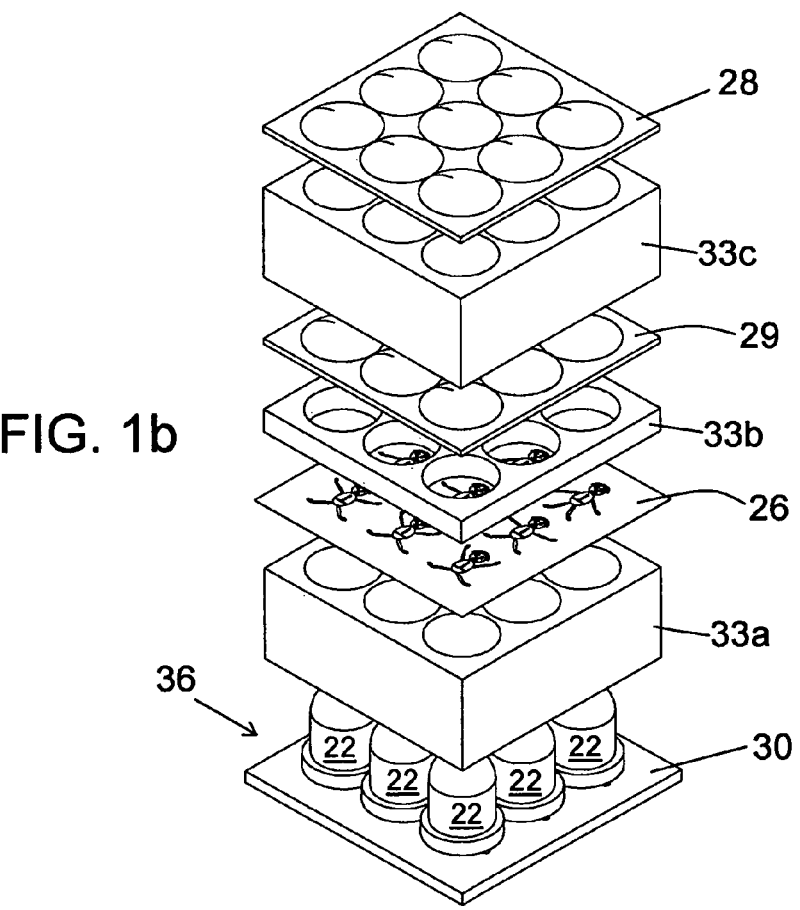
FIG. 1b is an exploded perspective view of the multi-LED projection module.

FIG. 1b is an exploded perspective view of the multi-LED projection module. A number of through-hole light emitting diodes (LEDs) 22 are mounted on a printed circuit board (PCB) 30. A light shield spacer 33a surrounds the LEDs. The light shield spacer comprises a rectangular block pierced with holes corresponding in number, placement and size to the LEDs; it may be part of the housing 20a or the housing could comprise an outer element, not shown. A light filtering multi-panel transparency image film 26 is positioned above the LEDs. The sheet 26 is in a plane parallel to the plane of the light sources 22. A second light shield spacer 33b is positioned above the image film. A multi-element condenser lens array 29 is positioned above the image film. A third light shield spacer 33c is positioned between the condenser lens array and a multi-element projection lens array 28. The number and placement of the transparency images and of the lens elements corresponds in number and approximate horizontal position to the light sources, i.e. LED array elements. The power source and electrical wiring for the LEDs and electronics is not illustrated.

Each projection element (LED, image, lens, etc.) is individually powered on and off under electronic control. Generally only one projector element is active at any time. By activating projection elements in a regular sequence a slide show or short animation may be projected onto a viewing surface.

To display an animation sequence the microcontroller lights LED(0) at time(0), LED(1) at time(DELAY), LED(2) at time(DELAY*2), LED(n) at time(DELAY*n), where n ranges from 0 to number of LEDs−1, and DELAY is a time period typically in the range of 50-200 milliseconds.

Pulse width modulation, often at a frequency of 100 Hz, is commonly used to reduce the brightness of LEDs. It can be used in this application to create certain visual effects. Fade-in and fade-out effects are produced by progressively increasing and decreasing the brightness of an LED. Pulse width modulation can be used to blend one animation frame into the next by simultaneously dimming one LED (decreasing the pulse width) while brightening another (increasing the pulse width). Blending one frame into the next creates a perception of smoother animation.

Figure 2:
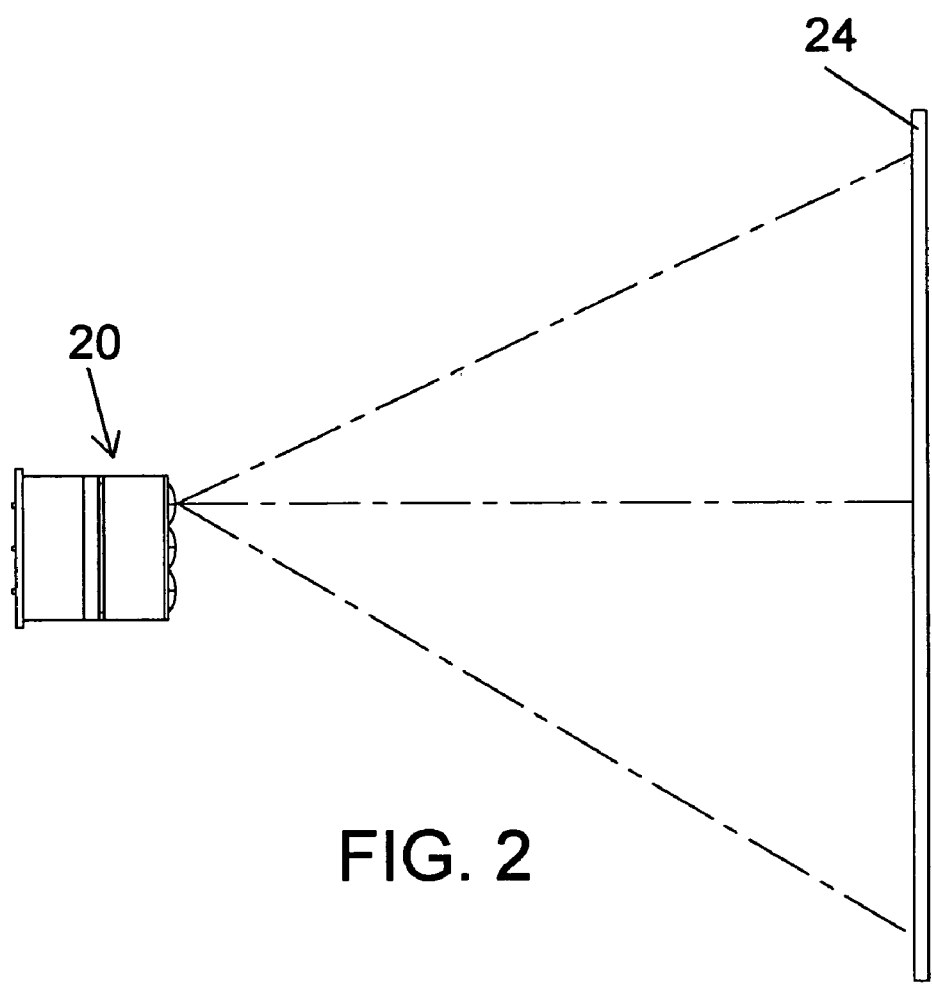
FIG. 2 is a side view of the multi-LED projection module and display screen.

FIG. 2 is a side view of the multi-LED projection module 20 projecting onto a display screen 24.

Figure 3:
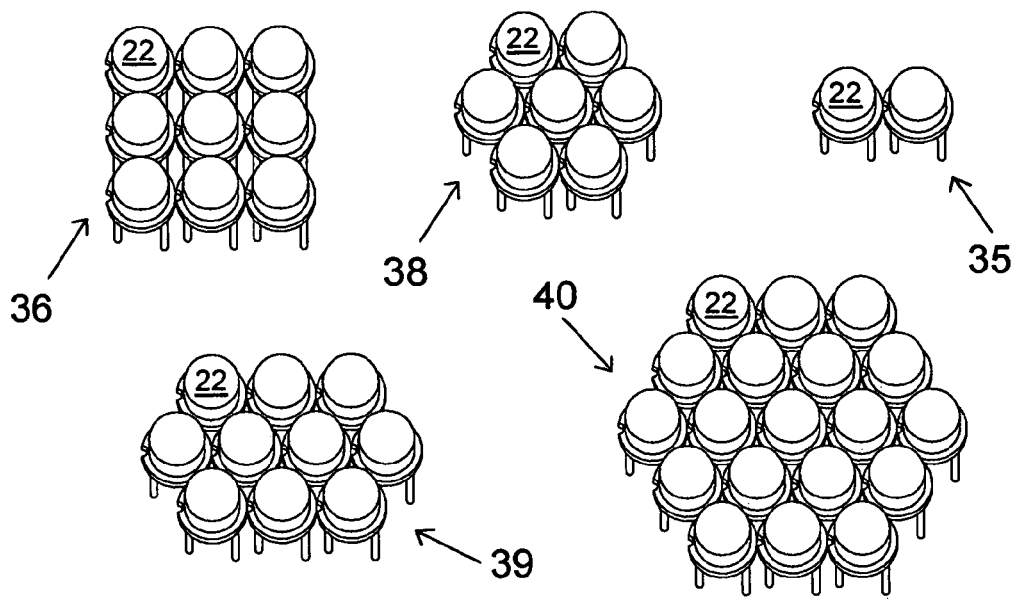
FIG. 3 is a perspective view of several LED array geometries.

FIG. 3 is a perspective view of several LED array geometries. A rectangular LED array 36 comprises nine LEDs. A single ring hexagonal array 38 comprises seven LEDs. A double array 35 comprises two LEDs. An elongated hexagonal array 39 comprises 10 LEDs. A double ring hexagonal array comprises 19 LEDs.

Figure 4:
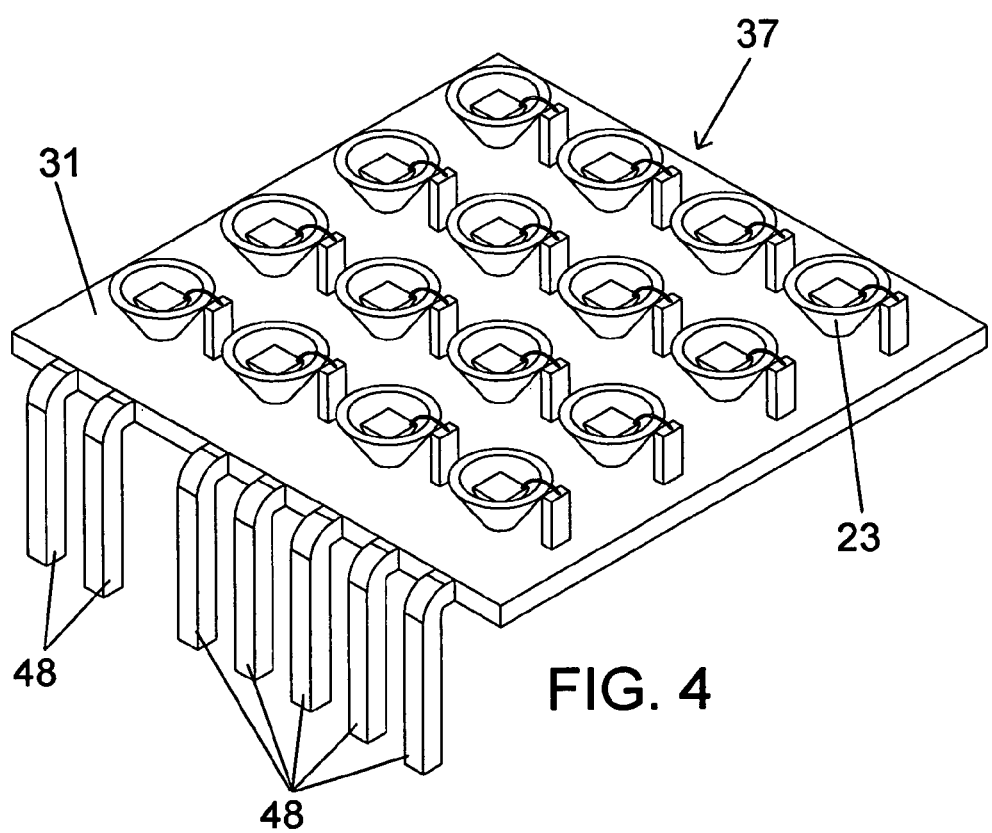
FIG. 4 is a perspective view of an integrated LED array.

FIG. 4 is a perspective view of an integrated LED array chip. Sixteen LED elements 23 are mounted directly on a substrate 31. A set of seven connector pins 48 supply power (two pins), specify on/off condition (one pin), and specify the LED under control (four pins specify up to sixteen addresses). Use of an integrated array may provide cost and size advantages for high volume applications compared to using through-hole or surface mount LEDs.

Figure 5:
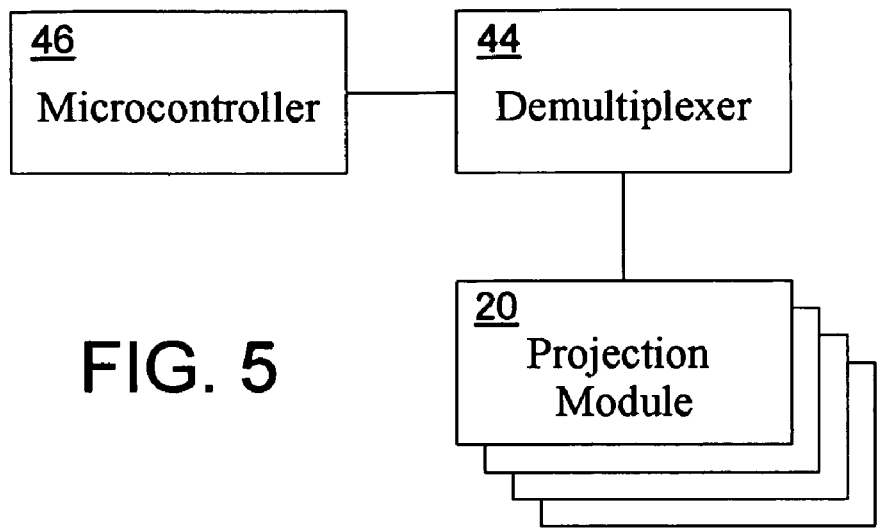
FIG. 5 is a control logic block diagram.

FIG. 5 is a control logic block diagram. A microcontroller 46 sends address and state data to a demultiplexer 44. The demultiplexer turns LEDs in projection module 20 on/off based on the address and state data received from the microcontroller. A single microcontroller can control a number of projection modules. If the microcontroller has sufficient data line outputs, and if the data outputs are at the right voltage and have sufficient current, the LEDs may be powered directly from the microcontroller data port output lines without the need for a separate demultiplexer.

Figure 6:
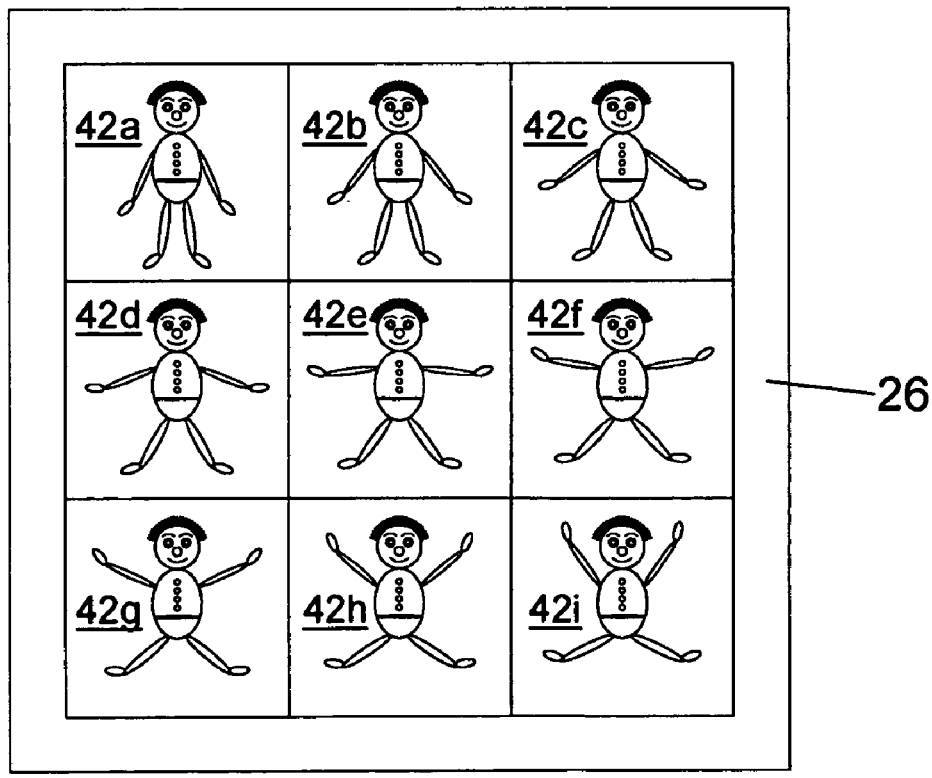
FIG. 6 is a front view of a multi-panel image slide.

FIG. 6 illustrates the structure of the multi-image transparency sheet or multi-panel image slide 26. A series of nine animation panels 42a through 42i are arranged in a rectangular array. Progressively displaying the panels in order from 42a to 42i creates an illusion that the figure is performing half of a jumping jack. Reversing the display order from 42i to 42a returns the figure to its start position. Repeating these sequences, 42a to 42i and reversing from 42i back again to 42a, creates the illusion of a continuous series of jumping jacks.

Figure 7A:
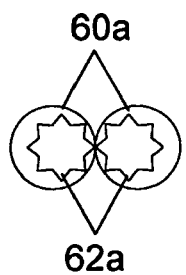
FIGS. 7a, b and c demonstrate a technique to geometrically converge projected images.
Figure 7B:
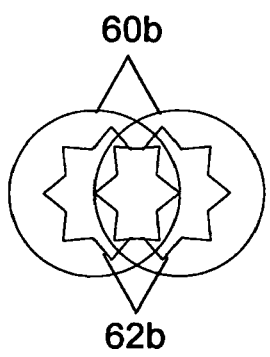
Figure 7C:
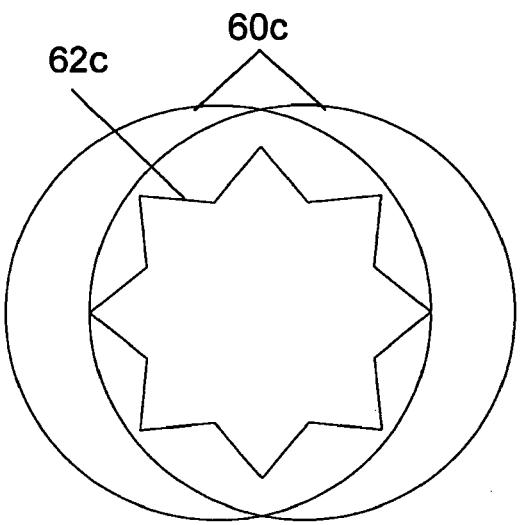

FIGS. 7a, 7b, and 7c demonstrate, geometrically, a method to converge projected images from linearly displaced positions in an image plane or image slide such as 26 in FIG. 6.

FIG. 7a is a front view of two disjoint circles 60a. Each circle contains an eight-pointed star 62a positioned off-center horizontally in the direction of the other circle.

FIG. 7b is a front view of two overlapping circles 60b. Each circle contains an eight-pointed star 62b positioned off-center horizontally in the direction of the other circle. Circles 60b in FIG. 7b are twice the size of circles 60a in FIG. 7a, but the centers of circles 60b are the same distance apart as the centers of circles 60a, thus the circles overlap. Stars 62b, because of their eccentric positions within the circles 60b, overlap to a greater degree than do the circles.

FIG. 7c is a front view of two overlapping circles 60c. Each circle contains an eight-pointed star 62c positioned off-center horizontally in the direction of the other circle. Circles 60c in FIG. 7c are four times the size of circles 60a in FIG. 7a, but the centers of circles 60c are the same distance apart as the centers of circles 60a and the circles overlap greatly. The stars 62c overlap completely and so appear to be a single star. In this example the figures converge at a magnification factor of four.

The stars in FIGS. 7a-7c are analogous to projected film frames. By shifting the position of each image in the image plane relative to its lens system, the image projections may be converged. The positional shift has vertical and horizontal components that are computed separately. The amount of shift is calculated using the following formulas:

image offset horizontal=light offset horizontal/magnification image offset vertical=light offset vertical/magnification Referring to FIGS. 7a-7c assume that circles 60a have a 5 mm radius, and that circles 60c have a 20 mm radium.

light offset horizontal=5 mm magnification=20 mm/5 mm=4 image offset horizontal=5 mm/4=1.25 mm light offset vertical=0 and image offset vertical=0

Therefore, stars 62a in the image plane are offset by 1.25 mm to cause the images 62c to converge when the magnification is 4.

Figure 8:
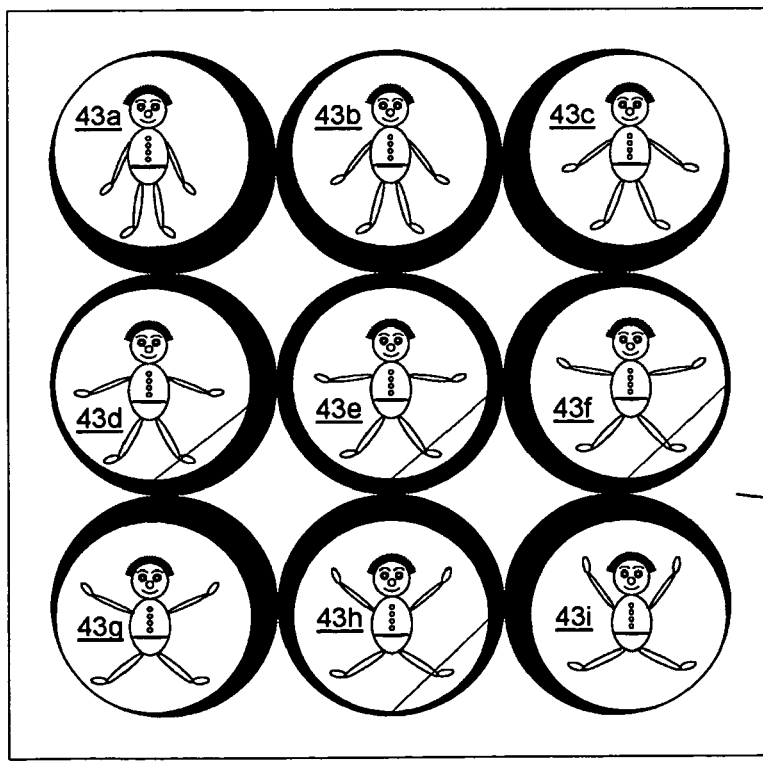
FIG. 8 is a front view of a multi-panel position-converged image slide.

FIG. 8 is a front view of a multi-panel position-converged image slide 26a. A set of animation cells 43a-43i are offset from the center position, but rather than converging toward the center as shown in FIG. 7a, the images are moved in the opposite direction. For example, 43a is positioned to the left and upward of center though the geometric adjustment would be to the right and down. The projector flips the image both horizontally and vertically with the somewhat counterintuitive result that moving the film images farther apart causes the projected images to converge and overlap.

Figure 9:
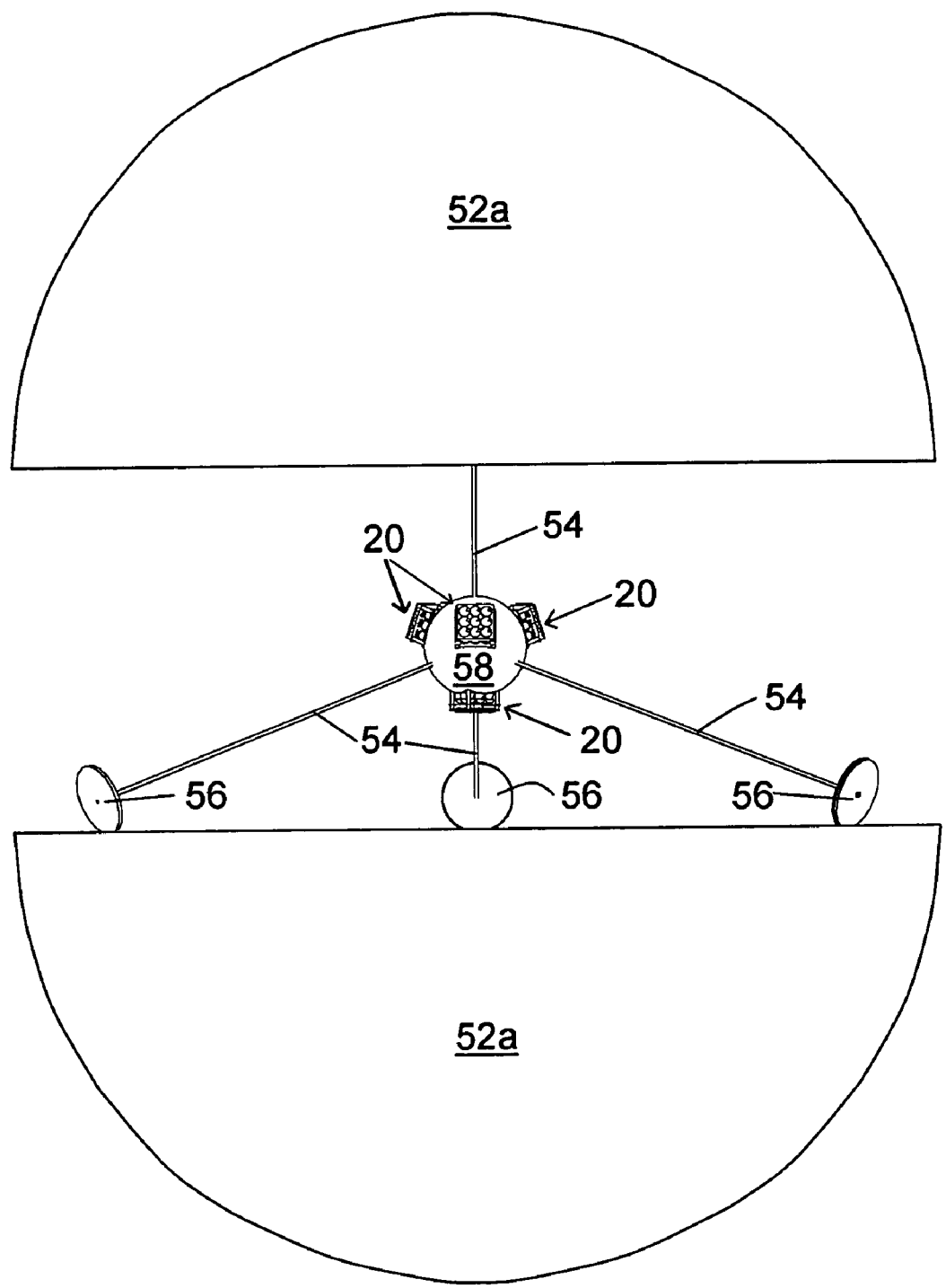
FIG. 9 is a perspective view of several multi-LED projection modules suspended within an inflatable ball.

FIG. 9 is an exploded perspective view of several multi-LED projection modules suspended within an inflatable ball 52. Bladder sections 52a are disassembled to show the ball interior. A set of four suspension cables 54 extend inwardly from the skin of the ball toward the center. One end of the cable attaches to an attachment button 56, the other end to the exterior of a globular electronics assembly 58. Four projection modules 20 are fixed to the electronics assembly. Assembly 58 contains a power source and electronic circuit (not shown in this figure). The inflated ball 52 is one example of many hollow translucent structures in which the projection module or modules can be used.

Although the description above contains many specifities, these should not be construed as limiting the scope of the invention but as merely providing illustrations of some of the presently preferred embodiments of the invention.

For example, although standard optical lenses are pictured, fresnel lenses may be used in the projection optics.

Although only a single LED is shown illuminating each frame or panel, multiple LEDs may be used. Light sources other than LEDs, such as fluorescent, incandescent, electroluminescent, etc. may be used.

Although condenser and projection lens are shown mounted in a planar array, non-planar arrays may be used. The condenser lens may be positioned between the light source and the film rather than between the film and the projector lens as shown in this application. A projector may be built that does not use a condenser lens, though the image quality is degraded.

Although through-hole and integrated LED arrays are described, surface mounted LEDs may be used. Surface mount LEDs are surface mounted to a substrate/PCB as opposed to through-hole type LEDs which are mounted through the substrate/PCB.

The above described preferred embodiments are intended to illustrate the principles of the invention, but not to limit its scope. Other embodiments and variations to this embodiment will be apparent to those skilled in the art and may be made without departing from the spirit and scope of the invention as defined in the following claims and their legal equivalents.

I claim:

1. A projector for projecting a series of images sequentially on a screen or surface, comprising:
    a housing,
    an array of light sources arranged generally in a common plane in the housing,
    a sheet with an array of projectable transparency images supported in the housing, positioned in a plane essentially parallel to said common plane, spaced from the array of light sources and positioned in registry with the light sources such that each transparency image can receive light from a respective one of the light sources to pass through the transparency image and to project the image outwardly toward a projector screen or surface,
    projection optics in the housing for focusing and converging light passing through each transparency image onto a projector screen or surface such that a succession of projected images from the array of images overlie one another essentially in registry, and
    electronics connected to the light sources for sequentially energizing the light sources to sequentially project the images onto a screen,
    whereby a slide show or an animated sequence can be projected onto a screen or surface using the projector.

2. The projector of claim 1, wherein the light sources are LEDs.

3. The projector of claim 2, wherein the LEDs are mounted on a printed circuit board in the housing.

4. The projector of claim 1, including at least nine light sources.

5. The projector of claim 1, wherein the electronics are capable of sequentially energizing the light sources as to project the images in a forward and reverse sequence.

6. The projector of claim 1, wherein the array of images is a rectangular array.

7. The projector of claim 1, wherein the array of images is a single ring hexagonal array.

8. The projector of claim 1, wherein the array of images is an elongated hexagonal array.

9. The projector of claim 1, wherein the array of images is a double ring hexagonal array.

10. The projector of claim 1, wherein said projector screen or surface is an interior surface of a hollow translucent structure.

11. The projector of claim 10, wherein the hollow translucent structure is an inflated ball.

* * * * *